(12) United States Patent
McInnis et al.

(10) Patent No.: US 11,300,674 B2
(45) Date of Patent: Apr. 12, 2022

(54) ANGLE OF ARRIVAL CORRELATION USING NORMALIZED PHASE

(71) Applicant: BAE Systems Information and Electronic Systems Integration Inc., Nashua, NH (US)

(72) Inventors: Michael R. McInnis, Nashua, NH (US); Daniel B. Harrison, Litchfield, NH (US); Jeffrey A. Reuter, Hollis, NH (US); Michael F. Roske, Milford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 106 days.

(21) Appl. No.: 16/849,222

(22) Filed: Apr. 15, 2020

(65) Prior Publication Data

US 2021/0325526 A1    Oct. 21, 2021

(51) Int. Cl.
*G01S 13/68* (2006.01)
*G01S 13/933* (2020.01)
*G01S 5/12* (2006.01)

(52) U.S. Cl.
CPC ............... *G01S 13/68* (2013.01); *G01S 5/12* (2013.01); *G01S 13/933* (2020.01)

(58) Field of Classification Search
CPC ....... H04L 27/2626; H04L 27/12; H04L 7/00; G01S 7/003; G01S 7/023; G01S 13/68; G01S 13/933; G01S 5/12; G01S 13/56; G01S 7/354; G01S 7/4008; G01S 7/282;
(Continued)

(56) References Cited

U.S. PATENT DOCUMENTS

| 7,706,475 B1 * | 4/2010 | Kopikare ................ H04L 27/38 375/324 |
| 8,000,382 B2 * | 8/2011 | Inanoglu ............. H04L 27/3863 375/221 |
| 9,379,930 B2 * | 6/2016 | Chen ...................... H04B 17/14 |

(Continued)

FOREIGN PATENT DOCUMENTS

WO    WO-2019228638 A1 * 12/2019    ........... H03F 1/3223

OTHER PUBLICATIONS

International Search Report, PCT/US21/26559, dated Jul. 14, 2021, 7 pages.

*Primary Examiner* — Olumide Ajibade Akonai
(74) *Attorney, Agent, or Firm* — Sand, Sebolt & Wernow LPA; Gary McFaline

(57) ABSTRACT

A method for automatically correlating radio wave pulses includes deterring a first normalized phase shift that corresponds to a first radio wave pulse. The method further includes determining a second normalized phase shift that corresponds to a second radio wave pulse. The method further includes determining the first normalized first normalized phase shift is equal to the second normalized phase shift. The method further includes in response to determining the first normalized phase shift is equal to the second normalized phase shift, correlating the first radio wave pulse and the second radio wave pulse as originating from a same radio wave transmitter. The method further includes transmitting a signal indicative of the first radio wave pulse and the second radio wave pulse as originating from the same radio wave transmitter through a circuit.

10 Claims, 4 Drawing Sheets

(58) Field of Classification Search
CPC ........ G01S 3/02; G01S 5/0205; G01S 5/0221; G01S 7/021; H04B 1/408
See application file for complete search history.

(56) References Cited

U.S. PATENT DOCUMENTS

| | | |
|---|---|---|
| 10,897,081 B2 * | 1/2021 | Ashida ................. H01Q 3/2605 |
| 2007/0133611 A1 | 6/2007 | Li et al. |
| 2009/0145232 A1 | 6/2009 | Suginouchi et al. |
| 2011/0260916 A1 | 10/2011 | Zhodzishsky et al. |
| 2019/0006995 A1 | 1/2019 | Jurko et al. |
| 2019/0348768 A1 | 11/2019 | Behdad et al. |

* cited by examiner

ANGLE OF ARRIVAL CORRELATION USING NORMALIZED PHASE

TECHNICAL FIELD

The following generally relates to a system or process for determining information about a radio wave transmitter. Specifically, the following relates to determining information about a radio wave transmitter as a function of captured radio pulses from the transmitter. More specifically, the following relates to determining information about a radio wave transmitter as a function of normalized radio wave pulses.

BACKGROUND

A radar detection system includes radio wave transmitters that emit radio wave pulses to detect and/or track objects within range of the transmitter. An aircraft flying over a territory with a radar detection system may be struck by several radio wave pulses from the transmitters thereby allowing the detection system to detect and/or track the aircraft. In certain scenarios, an aircraft pilot may desire to avoid radar detection or radar tracking. In these scenarios, an antenna array of the aircraft may capture radio wave pulses from the transmitters and a computing system of the aircraft may process the captured radio wave pulses to determine information about the transmitter, including a location of the transmitter. These computing systems determine information about a given transmitter by first processing each captured radio wave pulse in order to determine an angle that each pulse arrives at the aircraft. The computing system then determines an origin location for each captured pulse as a function of a corresponding angle of arrival thereby determining a location of each transmitter that emits each pulse. Unfortunately, processing each captured pulse to determine information about a transmitter is time consuming and requires a considerable amount of processing power. A delay in identifying a location of the transmitter may lead to the aircraft to being detected/tracked by the radar detection system.

Some computing systems have attempted to reduce the time needed to locate a transmitter by first grouping radio wave pulses with the same frequency. The system then assumes that the grouped pulses with the same frequency originate from the same transmitter. The system may then determine an origination location of a transmitter by processing the pulses in the grouped pulses. Unfortunately, these systems may incorrectly determine the location of the transmitter as current radar detection transmitters may transmit pulses with varying frequencies.

SUMMARY

For at least the reasons stated herein, there is a continuing need for a system and/or method that reduces the time and processing power needed to determine information about a radio wave transmitter. Furthermore, for at least the reasons stated herein, there is a continuing need for a system and/or method that accurately correlates radio wave pulses. Aspects of the present disclosure are directed to these continuing needs.

In one aspect, an exemplary embodiment of the present disclosure provides a computer-implemented method for automatically correlating radio wave pulses. The method in this example includes determining a first normalized phase shift that corresponds to a first radio wave pulse. The method in this example further includes determining a second normalized phase shift that corresponds to a second radio wave pulse. The method in this example further includes determining the first normalized is equal to the second normalized phase shift. The method in this example further includes in response to determining the first normalized phase shift is equal to the second normalized phase shift, correlating the first radio wave pulse and the second radio wave pulse as originating from a same radio wave transmitter. The method in this example further includes transmitting a signal indicative of the first radio wave pulse and the second radio wave pulse as originating from the same radio wave transmitter through a circuit. This exemplary embodiment or another exemplary embodiment may provide in response to correlating the first radio wave pulse and the second radio wave pulse, determining information about the transmitter as a function of the first radio wave pulse. This exemplary embodiment or another exemplary embodiment may provide wherein the information about the transmitter includes a location of the transmitter.

This exemplary embodiment or another exemplary embodiment provides determining an angle of arrival of the first pulse; and determining the location of the transmitter as a function of the determined angle of arrival. This exemplary embodiment or another exemplary embodiment may provide wherein the information includes a type of radio wave transmitter. This exemplary embodiment or another exemplary embodiment provides determining a first measured phase shift corresponding to the first radio wave pulse; determining a second measured phase shift corresponding to the second radio wave pulse; determining the first normalized phase shift as a function of the first measured phase shift; and determining the second normalized phase shift as a function of the second measured phase shift. This exemplary embodiment or another exemplary embodiment may provide normalizing a measured frequency of the first radio wave pulse and a frequency of the second radio wave pulse to the same normalized frequency; and determining the first normalized phase shift and the second normalized phase shift as a function of the normalized frequency. This exemplary embodiment or another exemplary embodiment may provide determining a first plurality of measured $2\pi$ radian wraps corresponding to the first radio wave pulse; determining a second plurality of measured $2\pi$ radian wraps corresponding to the second radio wave pulse; determining the first normalized phase shift as a function of a number of measured $2\pi$ radian wraps from the first plurality of measured $2\pi$ radian wraps; and determining the second normalized phase shift as a function of a number of measured $2\pi$ radian wraps from the second plurality of measured $2\pi$ radian wraps.

This exemplary embodiment or another exemplary embodiment may provide determining the first plurality of measured $2\pi$ radian wraps as a function of a distance between a first receiving element in an antenna array and a second receiving element in the antenna array, a measured frequency of the first radio wave pulse, and a measured wavelength of the first radio wave pulse; and determining the second plurality of measured $2\pi$ radian wraps as a function of the distance between the first receiving element and the second receiving element, a measured frequency of the second radio wave pulse, and a measured wavelength of the second radio wave pulse, wherein the first receiving element and the second receiving element capture the first radio wave pulse and the second radio wave pulse. This exemplary embodiment or another exemplary embodiment may provide determining a first plurality of normalized $2\pi$ radian wraps corresponding to the first radio wave pulse; determining a second plurality of normalized 2π radian wraps corresponding to the second radio wave pulse; determining the first normalized phase shift as a function of a number of normalized 2π radian wraps from the first plurality of normalized 2π radian wraps; and determining the second normalized phase shift as a function of one of a number of normalized 2π radian wraps from the second plurality of normalized 2π radian wraps.

In another aspect, an exemplary embodiment of the present disclosure may provide a computer-implemented method for automatically correlating radio wave pulses. The method may include determining a first plurality of normalized phase shifts that correspond to a first radio wave pulse. The method may further include determining a second plurality of normalized phase shifts that correspond to a second radio wave pulse. The method may further include determining each normalized phase shift in the first plurality of normalized phase shifts is equal to a normalized phase shift in the second plurality of normalized phase shifts. The method may further include in response to determining each normalized phase shift in the first plurality of normalized phase shifts is equal to a normalized phase shift in the second plurality of normalized phase shifts, correlating the first radio wave pulse and the second radio wave pulse as originating from a same radio wave transmitter. The method may further include transmitting a signal indicative of the first radio wave pulse and the second radio wave pulse as originating from the same radio wave transmitter through a circuit. This exemplary embodiment or another exemplary embodiment may provide in response to correlating the first radio wave pulse and the second radio wave pulse, determining information about the transmitter as a function of the first radio wave pulse. This exemplary embodiment or another exemplary embodiment may provide determining an angle of arrival of the first pulse; and determining a location of the transmitter as a function of the determined angle of arrival.

This exemplary embodiment or another exemplary embodiment may provide normalizing a measured frequency of the first radio wave pulse to a normalized frequency; normalizing a measured frequency of the second radio wave pulse to the normalized frequency; determining each normalized phase shift in the first plurality of normalized phase shifts as a function of the normalized frequency; and determining each normalized phase shift in the second plurality of normalized phase shifts as a function of the normalized frequency. This exemplary embodiment or another exemplary embodiment may provide determining a first plurality of measured 2π radian wraps corresponding to the first radio wave pulse; determining a second plurality of measured 2π radian wraps corresponding to the second radio wave pulse; determining each normalized phase shift in the first plurality of normalized phase shifts as a function of a measured 2π radian wrap in the first plurality of measured 2π radian wraps; and determining each normalized phase shift in the second plurality of normalized phase shifts as a function of a measured 2π radian wrap in the second plurality of measured 2π radian wraps. This exemplary embodiment or another exemplary embodiment or another exemplary embodiment may provide determining a first plurality of normalized 2π radian wraps corresponding to the first radio wave pulse; determining a second plurality of normalized 2π radian wraps corresponding to the second radio wave pulse; determining each normalized phase shift in the first plurality of normalized phase shifts as a function of a normalized 2π radian wrap in the first plurality of normalized 2π radian wraps; and determining each normalized phase shift in the second plurality of normalized phase shifts as a function of a normalized 2π radian wrap in the second plurality of normalized 2π radian wraps.

This exemplary embodiment or another exemplary embodiment may provide determining a first plurality of measured phase shifts corresponding to the first radio wave pulse; determining a second plurality of measured phase shifts corresponding to the second radio wave pulse; determining each normalized phase shift in the first plurality normalized phase shifts as a function of a measured phase shift in the first plurality of measured phase shifts; and determining each normalized phase shift in the second plurality of normalized phase shifts as a function of a measured phase shift in the second plurality of measured phase shifts. This exemplary embodiment or another exemplary embodiment may provide determining a first measured wavelength of the first radio pulse; determining a second measured wavelength of the second radio pulse; determining each normalized phase shift in the first plurality of normalized phase shifts as a function of the first measured wavelength; and determining each normalized phase shift in the second plurality of normalized phase shifts as a function of the second measured wavelength. This exemplary embodiment or another exemplary embodiment may provide determining a first normalized wavelength as a function of the first measured wavelength; determining a second normalized wavelength as a function of the second measured wavelength; determining each normalized phase shift in the first plurality of normalized phase shifts as a function of the first normalized wavelength; and determining each normalized phase shift in the second plurality of normalized phase shifts as a function of the second normalized wavelength.

In yet another aspect, an exemplary embodiment of the present disclosure may provide a computer-implemented method for automatically determining a location of a radio wave transmitter. The method may include capturing a plurality of radio wave pulses with a plurality of receiving elements in an antenna array. The method may further include transforming the plurality of captured radio wave pulses into a plurality of digital signals, wherein each digital signal in the plurality of digital signals corresponds to a radio wave pulse in the plurality of captured radio wave pulses. The method may further include determining a plurality of normalized phase shifts, wherein each normalized phase shift in the plurality of normalized phase shifts corresponds to a radio wave pulse in the plurality of captured radio wave pulses. The method may further include determining at least two radio wave pulses in the plurality of captured radio waves originate from a same radio wave transmitter as a function of at least two normalized phase shifts in the plurality of normalized phase shifts; and transmitting a signal indicative of the at least two radio wave pulses as originating from the same radio wave transmitter through a circuit.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
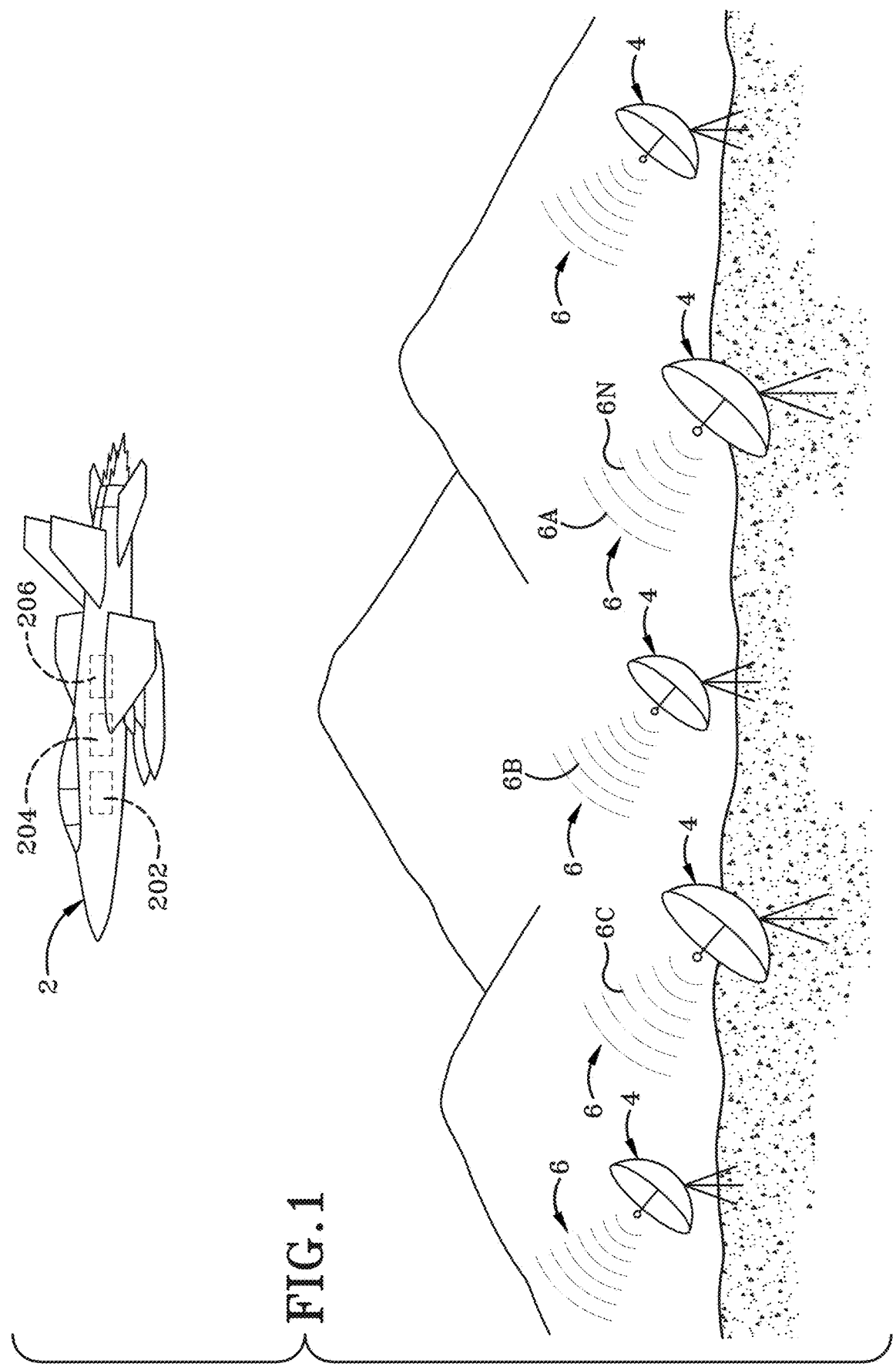
FIG. 1 (FIG. 1) depicts an aircraft and a plurality of radio wave transmitters.

FIG. 1 depicts a platform 2 and a plurality of radio wave transmitters 4. Each radio wave transmitter 4 may emit a number of radio wave pulses 6. As will be discussed in further detail herein, the platform 2 may capture radio wave pulses 6 from the transmitters 4. While the platform 2 is depicted as an aircraft, the platform 2 may be any stationary or moveable device. Furthermore, the platform 2 may be a vehicle that may be manned or unmanned, and may be land-based, water-based, or aerial-based. Platform 2 may equally be a fixed installation, such as a telecommunications tower. As will be discussed in further detail herein, the platform 2 may determine information about a transmitter 4 as a function of corresponding pulses 6.

Figure 2:
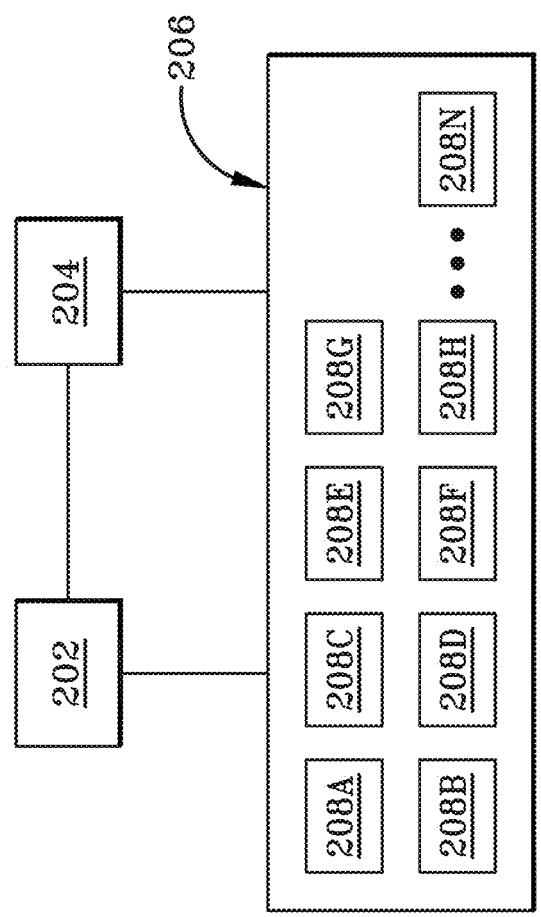
FIG. 2 (FIG. 2) schematically depicts the aircraft of FIG. 1 including a power source, an antenna array, and a logic.

FIG. 2 diagrammatically depicts the platform 2. The platform 2 may include a power source 202, a logic unit such as a processor 204, and an antenna array 206. The power source 202 is connected to and supplies power to the logic 204 and the antenna array 206. The antenna array 206 is connected to and in communication with the logic 204. The antenna array 206 includes a plurality of receiving elements 208.

As depicted in FIG. 2, the antenna array 206 in one example includes a first receiving element 208A, a second receiving element 208B, a third receiving element 208C, a fourth receiving element 208D, a fifth receiving element 208E, a sixth receiving element 208F, a seventh receiving element 208G, an eighth receiving element 208H, . . . , and an N receiving element 208N, wherein the N receiving element 208N corresponds to any number of receiving element 208. In one example there are a fourteen receiving elements. While the antenna array 206 is depicted as including at least nine receiving elements 208, it is understood that the antenna array 206 may include at least two receiving elements 208. The receiving elements 208 may be arranged in any manner relative to one another (i.e., linearly arranged, triangularly arranged, etc.).

Each receiving element 208 captures any number of pulses 6. The captured pulses 6 may include a first pulse 6A, a second pulse 6B, a third pulse 6C, a fourth pulse 6D, . . . , and an N pulse 6N, wherein the N pulse 6N corresponds to any number of pulse 6. In one example there are fourteen pulses. Furthermore, each receiving element 208 sends a signal corresponding to each captured pulse 6 to the logic 204.

In one embodiment, the platform 2 may be a legacy platform 2 with a legacy logic. In this embodiment, the legacy logic may be removed and replaced with the logic 204 or different software may be installed on the legacy logic that properly interacts with the antenna array 206 and the power source 202 turning the legacy logic into the logic 204. As such, there is no needed to rebuild or construct a new platform 2 when installing the logic 204. However, it is understood that the logic 204 could be constructed on a new platform 2.

The logic 204 may be connected to the antenna array 206 via a wired or wireless connection. If the logic 204 is wirelessly connected to the antenna array 206 it is possible for the logic 204 to be located remotely from the antenna array 206. The remote connection could place the logic 204 at other locations on the platform 2 or at another location remote from the platform 2. In this instance, the logic 204 could be powered by a different source.

Figure 3:
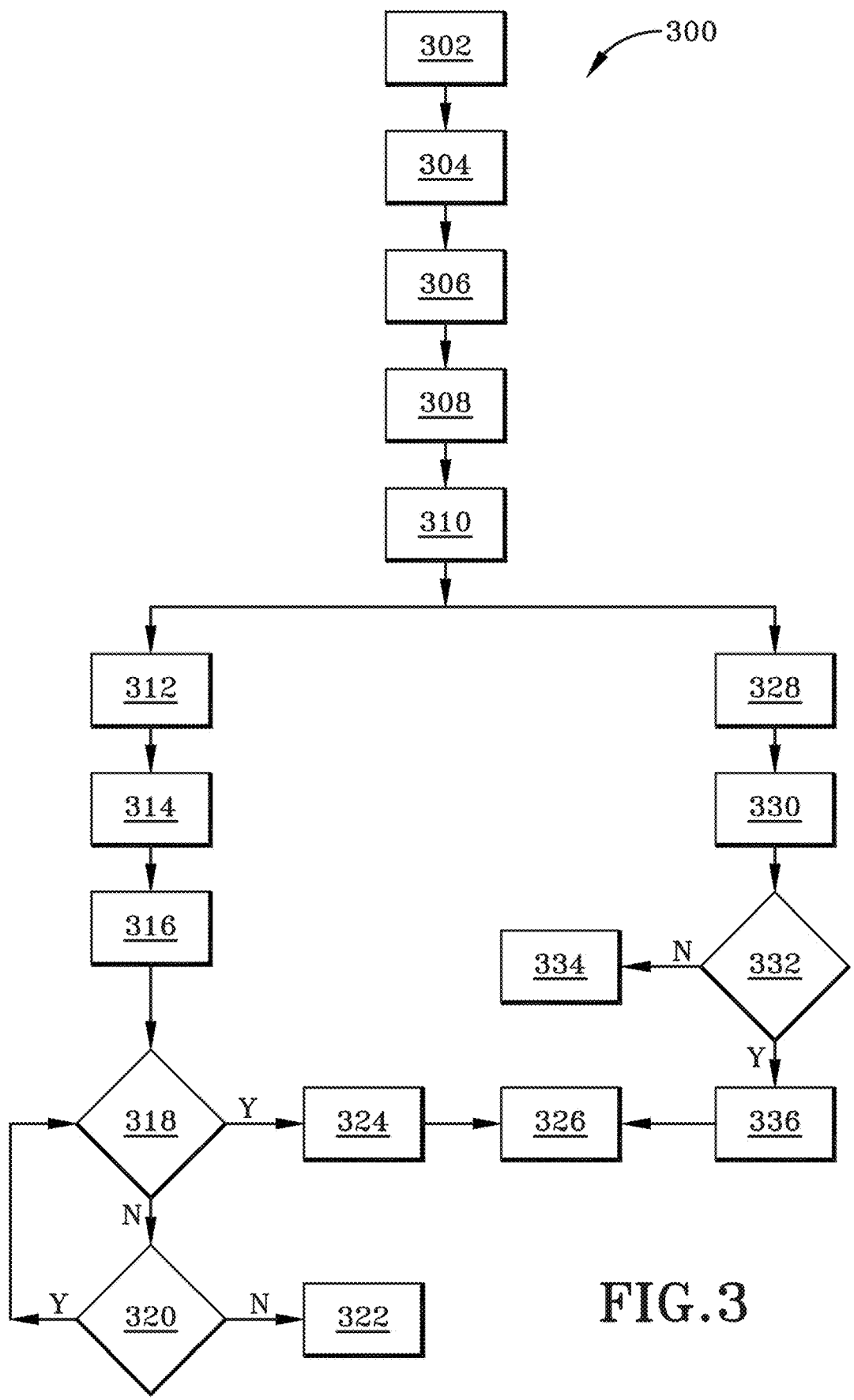
FIG. 3 (FIG. 3) depicts a system or a method according to aspects of the present disclosure.

FIG. 3 illustrates a process or a system 300 according to the present disclosure for automatically determining information about a transmitter 4.

At 302, the receiving elements 208 in the antenna array 206 captures pulses 6 from one or more transmitters 4 and the receiving element 208 sends a signal corresponding to each capture pulse 6 to the logic 204. Each captured signal may include a measured frequency of a capture pulse 6, a measured wavelength of a captured pulse 6, at least one crest and trough of a captured pulse 6, a period of a captured pulse 6, and an amplitude of a captured pulse 6.

In one example, the antenna array 206 includes a first receiving element 208A and a second receiving element 208B. In this example, the first receiving element 208A and the second receiving element 208B each capture a first pulse 6A a second pulse 6B, a third pulse 6C, and a fourth pulse 6D. As such, the first receiving element 208A may send four signals to the logic 204 (a first signal corresponding to the first pulse 6A, a second signal corresponding to the second pulse 6B, a third signal corresponding to the third pulse 6C, and a fourth signal corresponding to the fourth pulse 6D) and the second receiving element 208B may send four signals to the logic 204 (a fifth signal corresponding to the first pulse 6A a sixth signal corresponding to the second pulse 6B, a seventh signal corresponding to the third pulse 6C, and an eighth signal corresponding to the fourth pulse 6D). Accordingly, the logic 204 may receive eight signals, four from the first receiving element 208A and four from the second receiving element 208B.

In another example, the antenna array 206 includes a first receiving element 208A, a second receiving element 208B, a third receiving element 208C, and a fourth receiving element 208D. In this example the receiving elements 208A-D may each captured a first pulse 6A and a second pulse 6B.

In this example, the receiving elements 208A-D each send two signals, a signal corresponding to the first pulse 6A and a signal corresponding to the pulse second pulse 6B to the logic 204. Accordingly, the logic 204 may receive eight signals.

At 304, a processor of the logic 204 that is configured to automatically determine information about a radio wave transmitter 4 (the "configured processor") receives the signals from the receiving elements 208 and normalizes the measured frequency of each received signal to a same frequency. According to one example, the selection of the same frequency is based upon a user selection. In one example, a first signal may include a frequency of 5 gigahertz (GHz) and a second signal may include a frequency of 3 GHz. In this example, a user selects 1 GHz as the normalized frequency and the configured processor normalizes the frequency of the first signal and the second signal to a frequency of 1 GHz. In another example, a first signal may include a frequency of 2 GHz and a second signal may include a frequency of 4 GHz. In this example, the configured processor normalizes the frequency of the first signal and the second signal to a frequency of 2 GHz.

At 306, the configured processor determines or processes a normalized wavelength for each received signal as a function of the measured wavelength of a signal, the measured frequency of a signal, and the normalized frequency of a signal. The configured processor determines the normalized wavelength for each received signal according to $$\lambda_0 = \frac{\omega_1 \lambda_1}{\omega_0}, \qquad \text{EQUATION 1}$$

wherein $\lambda_0$ is the normalized wavelength, $\omega_1$ is the measured frequency, $\lambda_1$ is the measured wavelength, and wo is the normalized frequency.

In one example, a signal includes a measured wavelength of 10 centimeters (cm), a measured frequency of 3 GHz and the configured processor normalized the measured frequency to 1 GHz. In this example, the configured processor determines the normalized wavelength as 30 cm. In another example, a signal may include a measured wavelength of 3 cm, a measured frequency of 4 GHz and the configured processor normalizes the measured frequency to 6 GHz. In this example, the configured processor determines the normalized wavelength as 2 cm.

At 308, the configured processor determines a measured phase shift or measured Δphase between signals that correspond to the same pulse 6. When there are more than two receiving elements 208 in the antenna array 206, the configured processor may select one of the receiving elements 208 as a reference receiving element 208 and may determine a measured Δphase between signals from the reference receiving element 208 and signals from the other receiving elements 208 that correspond to a pulse 6. According to one example, the reference element is based on a user selection.

In one example, the antenna array 206 includes two receiving elements 208, a first receiving element 208A and a second receiving element 208B. In this example, the first receiving element 208A and the second receiving element 208B may capture a first pulse 6A and a second pulse 6B. As such, the configured processor may receive a first signal corresponding to the first pulse 6A from the first receiving element 208A, a second signal corresponding to the first pulse 6A from the second receiving element 208B, a third signal corresponding to the second pulse 6B from the first receiving element 208A, and a fourth signal corresponding to the second pulse 6B from the second receiving element 208B. The configured processor determines a measured Δphase between the first signal and the second signal as the first signal and the second signal correspond to the same first pulse 6A and a measured Δphase between the third signal and the fourth signal as the third signal and the fourth signal correspond to the same second pulse 6B.

In yet another example, the antenna array 206 includes a first receiving element 208A, a second receiving element 208B, a third receiving element 208C, and a fourth receiving element 208D and a user may select the third receiving element 208C as the reference element. In this example, the receiving elements 208A-D may each capture a first pulse 6A. As such, the configured processor may receive four signals corresponding to the first pulse 6A including a first signal from the first receiving element 208A, a second signal from the second receiving element 208B, a third signal from the third receiving element 208C, and a fourth signal from the fourth receiving element 208D. In this example, the configured processor determines a measured Δphase between the third signal and the first signal, a Δphase between the third signal and the second signal, and a measured Δphase between the third signal and the fourth signal.

In yet another example, the antenna array 206 includes a first receiving element 208A, a second receiving element 208B, a third receiving element 208C, a fourth receiving element 208D, a fifth receiving element 208E, a sixth receiving element 208F, a seventh receiving element 208G and an eighth receiving element 208H and a user may select the fifth receiving element 208E as the reference element. In this example, the receiving elements 208A-H may each capture a first pulse 6A. As such, the configured processor may receive eight signals corresponding to the first pulse 6A.

The configured processor may determine a measured Δphase between a fifth signal from the fifth receiving element 208E and a first signal from the first receiving element 208A, a measured Δphase between the fifth signal and a second signal from the second receiving element 208B, a measured Δphase between the fifth signal and a third signal from the third receiving element 208C, a measured Δphase between the fifth signal and a fourth signal from the fourth receiving element 208D, a measured Δphase between the fifth signal and a sixth signal from the sixth receiving element 208F, a measured Δphase between the fifth signal and a seventh signal from the seventh receiving element 208G, and a measured Δphase between the fifth signal and an eighth signal from the eighth receiving element 208H.

The configured processor may determine measured Δphase by determining a distance between two like points (i.e., a first crest, a first trough, etc.) of two signals that correspond to a same pulse. In one example, a first signal corresponding to a first pulse 6A may have a first crest at $$\frac{\pi}{2}$$

radians from the origin and a second signal corresponding to the same first pulse 6A may have a first crest at 7 radians from the origin. In this example the configured processor determines a measured Δphase between the first signal and the second signal as $$\frac{\pi}{2}.$$

In another example, a first signal corresponding to a second pulse 6B may have a first trough at $\frac{3}{4}\pi$ radians from the origin and a second signal corresponding to the same second pulse 6B may have a first trough at $\pi$ radians from the origin. In this example, the configured processor determines a measured Δphase between the first signal and the second signal as $\frac{1}{4}\pi$.

At 310, the configured processor may determine a maximum number of $2\pi$ radian wraps between two signals that correspond to a same pulse 6 or a number of $2\pi$ radian wraps between two signals that correspond to a same pulse 6.

In one embodiment, the antenna array 206 includes two receiving elements 208, a first receiving element 208A and a second receiving element 208B. In this embodiment, the configured processor determines a maximum number of $2\pi$ radian wraps between two signals that correspond to a same pulse 6. The configured processor may determine a maximum number of $2\pi$ radian wraps as a function of a distance between the first receiving element 208A and the second receiving element 208B, the measured frequency of each signal that correspond to a same pulse 6, and the measured wavelength of each signal that correspond to a same pulse 6.

In one example, the first receiving element 208A and the second receiving element 208B may capture a first pulse 6A and a second pulse 6B. In this example, the first pulse 6A and the second pulse 6B has the same frequency and the same wavelength. The configured processor may receive a first signal corresponding to the first pulse 6A from the first receiving element 208A, a second signal corresponding to the first pulse 6A from the second receiving element 208B, a third signal corresponding to second pulse 6B from the first receiving element 208A, and a fourth signal corresponding to the second pulse 6B from the second receiving element 208B. In this example, the configured processor determines a first maximum number of $2\pi$ radian wraps between the first signal and the second signal as the first signal and the second signal correspond to the same first pulse 6A. The configured processor may further determine a maximum number of $2\pi$ radian wraps between the third signal and the fourth signal as the third signal and the fourth signal correspond the same second pulse 6B.

In another example, the first receiving element 208A and the second receiving element 208B capture a first pulse 6A and a second pulse 6B. In this example, the first pulse 6A and the second pulse 6B may have different frequencies and different wavelengths. The configured processor may determine a first maximum number of $2\pi$ radian wraps between a first signal from the first receiving element 208A and a second signal from the second receiving element 208B wherein the first signal and the second signal each correspond the first pulse 6A. The configured processor may further determine a second maximum number of $2\pi$ radian wraps for a third signal from the first receiving 208A and a fourth signal from the second receiving element 208B, wherein the third signal and the fourth signal correspond to the second pulse 6B. In this example, first pulse 6A and the second pulse 6B may originate from a same transmitter 4 even though the first pulse 6A and the second pulse 6B have different wavelengths and frequencies. Accordingly, the first maximum number of $2\pi$ radian wraps may be different from the second maximum number of $2\pi$ radian wraps for to pulses 6 that originate from a same transmitter 4.

In another embodiment, the antenna array 206 includes more than two receiving elements 208. In this embodiment, the configured processor may determine a number of $2\pi$ radian wraps between two signals that correspond to a same pulse 6 as a function of a distance between receiving elements 208, the determined measured $\Delta$phase between signals that correspond to a same pulse 6, and the measured frequency of the signals.

In one example, the antenna array 206 includes a first receiving element 208A, a second receiving element 208B, a third receiving element 208C, and a fourth receiving element 208D. In this example, the receiving elements 208A-D may capture a first pulse 6A and a second pulse 6B. As such, the configured processor may receive four signals, a first signal from the first receiving element 208A, a second signal from the second receiving element 208B, a third signal from the third receiving element 208C, and a fourth signal from the fourth receiving element 208D that correspond to the first pulse 6A and four signals, a fifth signal from the first receiving element 208A, a sixth signal from the second receiving element 208B, a seventh signal from the third receiving element 208C, and an eighth signal from the fourth receiving element 208D that correspond to the second pulse 6B.

In this example, a user selects the first receiving element 208A as the reference element. Accordingly, the configured processor may determine a first measured $\Delta$phase between the first signal and the second signal, a second measured $\Delta$phase between the first signal and the third signal, a third measured $\Delta$phase between the first signal and the fourth signal, a fourth measured $\Delta$phase between the fifth signal and the sixth signal, a fifth measured $\Delta$phase between the fifth signal and the seventh signal, and a sixth measured $\Delta$phase between the fifth signal and the eighth signal.

After determining the measured $\Delta$phase, the configured processor may determine a number of $2\pi$ radian wraps between two signals corresponding to a same pulse 6, wherein one of the two signals is from the reference receiving element 208A. The configured processor may determine the number of $2\pi$ radian wraps as a function of the determined measured $\Delta$phase that correspond to the same pulse 6, the distance between two reference elements 208 that correspond to the signals, and the measured frequency of the two signals.

In this example, the configured processor determines a first number of $2\pi$ radian wraps between the first signal and the second signal as a function of the first measured $\Delta$phase, the second measured $\Delta$phase, and the third measured $\Delta$phase, a distance between the first receiving element 208A and the second receiving element 208B, and the measured frequency of the first signal and the second signal as the first signal and the second signal correspond to the same first pulse 6A and the first measured $\Delta$phase, the second measured $\Delta$phase, and the third measured $\Delta$phase correspond to the same first pulse 6A. The configured processor may similarly determine a second number of $2\pi$ radian wraps between the first signal and the third signal, and a third number of $2\pi$ radian wraps between first signal and the fourth signal.

The configured processor may further determine a fourth number of $2\pi$ radian wraps between the fifth signal and the sixth signal as a function of the fourth measured $\Delta$phase, the fifth measured $\Delta$phase, and the sixth measured $\Delta$phase, a distance between the first receiving element 208A and the second receiving element 208B, and the measured frequency of the first signal and the second signal as the first signal and the second signal correspond to the same second pulse 6B and the fourth measured $\Delta$phase, the fifth measured $\Delta$phase, and the sixth measured $\Delta$phase correspond to the same second pulse 6B. The configured processor may similarly determine a fifth number of $2\pi$ radian wraps between the fifth signal and the seventh signal, and a sixth number of $2\pi$ radian wraps between fifth signal and the eighth signal.

In another example, the antenna array 206 includes a first receiving element 208A, a second receiving element 208B, a third receiving element 208C, a fourth receiving element 208D, a fifth receiving element 208E, and a sixth receiving element 208F. In this example, the receiving elements 208A-F may capture a first pulse 6A and as such, the configured processor may receive six signals, one from each receiving element 208A-F. The a user may select the third receiving element 208C as the reference receiving element and may determine a first measured $\Delta$phase between a third signal from the third receiving element 208C and a first signal from the first receiving element 208A, a second measured $\Delta$phase between the third signal and a second signal from the second receiving element 208B, a third measured $\Delta$phase between the third signal and a fourth signal from the fourth receiving element 208D, a fourth measured Δphase between the third signal and a fifth signal from the fifth receiving element 208E, and a fifth measured Δphase between the third signal and a sixth signal from the sixth receiving element 208F.

After determining the measured Δphase, the configured processor may determine the number of 2π radian wraps for two signals corresponding the same pulse 6, wherein one of the two signals is from the reference receiving element 208C. The configured processor may determine the number of 2π radian wraps as a function of the determined measured Δphase that correspond to the same pulse 6, the distance between two reference elements 208 that correspond to the signals, and the measured frequency of the two signals.

In this example, the configured processor determines a first number of 2π radian wraps between the third signal and the first signal as a function of the first measured Δphase, the second measured Δphase, the third measured Δphase, the fourth measured Δphase, and the fifth measured Δphase, a distance between the third receiving element 208C and the first receiving element 208A, and the measured frequency of the third signal and the first signal as the third signal is from the reference receiving element 208C, the third signal and the first signal correspond to the same first pulse 6A and the first measured Δphase, the second measured Δphase, the third measured Δphase, the fourth measured Δphase, and the fifth measured Δphase correspond to the first pulse 6A. The configured processor may similarly determine a second number of 2π radian wraps between the third signal and the second signal, a third number of 2π radian wraps between the third signal and the fourth signal, a fourth number of 2π radian wraps between the third signal and the fifth signal, and a fifth number of 2π radian wraps between the third signal and the sixth signal.

If at 310 the configured processor determined a maximum number of 2π radian wraps between two signals that correspond to a same pulse 6, then the configured processor may proceed to 312. If the configured processor did not determine a maximum number of 2π radian wraps between two signals that correspond to a same pulse 6, then the configured processor may proceed to 310. At 312, the configured processor may determine a maximum number of normalized 2π radian wraps. The configured processor may determine the maximum number of 2π radian wraps as a function of the distance between the first receiving element 208A and the second receiving element 208B, the normalized frequency of two signals that correspond to a same pulse 6, and the normalized wavelength of two signals that correspond to a same pulse 6.

In one example, the first receiving element 208A and the second receiving element 208B capture a first pulse 6A. Accordingly, the configured processor may receive a first signal from the first receiving element 208A that corresponds to the first pulse 6A and a second signal from the second receiving element 208B that corresponds to the first pulse 6A. In this example, the configured processor normalizes the frequency of the first signal and the second signal, to a same frequency as described herein. Furthermore, the configured processor may determine a normalized wavelength for the first signal and the second signal as described herein.

The configured processor may determine a maximum number of normalized 2π radian wraps between the first signal and the second signal as the first signal and the second signal correspond to the same first pulse 6A. The configured processor may determine a maximum number of normalized 2π radian wraps between the first signal and the second signal as a function of the normalized wavelength of the first signal and the second signal, the normalized frequency of the first signal and the second signal and the distance between the first receiving element 208A and the second receiving element 208B.

In another example, the first receiving element 208A and the second receiving element 208B capture a first pulse 6A and a second pulse 6B. Accordingly, the configured processor may receive a first signal corresponding to the first pulse 6A from the first receiving element 208A, a second signal corresponding to the first pulse 6A from the second receiving element 208B, a third signal corresponding to the second pulse 6B from the first receiving element 208A, and a fourth signal corresponding to the second pulse 6B from the second receiving element 208B. In this example, the configured processor may normalize the frequency of the first signal, the second signal, the third signal and the fourth signal to a same frequency as described herein. Furthermore, the configured processor may determine a normalized wavelength for the first signal, the second signal, the third signal, and the fourth signal as described herein.

The configured processor may determine a maximum number of normalized 2π radian wraps between the first signal and the second signal as the first signal and the second signal correspond to the same first pulse 6A and a maximum number of normalized 2π radian wraps between the third signal and the fourth signal as the third signal and the fourth signal correspond to the same second pulse 6B. The configured processor may determine a maximum number of normalized 2π radian wraps between the first signal and the second signal as a function of the normalized wavelength of the first signal and the second signal, the normalized frequency of the first signal and the second signal and the distance between the first receiving element 208A and the second receiving element 208B. The configured processor may further determine a maximum number of normalized 2π radian wraps between the third signal and the fourth signal as a function of the normalized wavelength of the third signal and the fourth signal, the normalized frequency of the third signal and the fourth signal and the distance between the first receiving element 208A and the second receiving element 208B.

At 314, the configured processor may determine each possible combination of measured 2π radian wraps and normalized 2π radian wraps.

In one example, at 310, the configured processor determines the maximum number measured of 2π radian wraps is 2 (an A wrap and a B wrap, wherein the A wrap is a first measured wrap and the B wrap is a second measured wrap) and, at 312, the configured processor may determine the maximum number normalized of 2π radian wraps is 4 (a C wrap, a D wrap, an E wrap, and an F wrap, wherein the C wrap is a first normalized wrap, the D wrap is a second normalized wrap, the E wrap is a third normalized wrap, and the F wrap is a fourth normalized wrap). In this example a first combination of measured 2π radian wraps and normalized 2π radian wraps may include the A wrap and the C wrap, a second combination of measured 2π radian wraps and normalized 2π radian wraps may include the A wrap and the D wrap, a third combination of measured 2π radian wraps and normalized 2π radian wraps include the A wrap and the E wrap, a fourth combination of measured 2π radian wraps and normalized 2π radian wraps may include the A wrap and the F wrap, a fifth combination of measured 2π radian wraps and normalized 2π radian wraps may include the B wrap and the C wrap, a sixth combination of measured 2π radian wraps and normalized 2π radian wraps may include the B wrap and the D wrap, a seventh combination of measured 2π radian wraps and normalized 2π radian wraps may include the B wrap and the E wrap, and an eighth combination of measured 2π radian wraps and normalized 2π radian wraps may include the B wrap and the F wrap.

In another example, at 310, the configured processor determines the maximum number of measured 2π radian wraps is 3 (an A wrap, a B wrap, and a C wrap, wherein the A wrap is a first measured wrap, the B wrap is a second measured wrap, and the C wrap is a third measured wrap) and, at 312, the configured processor may determine the maximum number of normalized 2π radian wraps is 3 (a D wrap, an E wrap, and an F wrap, wherein the D wrap is a first normalized wrap, the E wrap is a second normalized wrap, and the F wrap is a third normalized wrap). In this example, the configured processor may determine a first combination of measured 2π radian wraps and normalized 2π radian wraps may include the A wrap and the D wrap, a second combination of measured 2π radian wraps and normalized 2π radian wraps may include the A wrap and the E wrap, a third combination of measured 2π radian wraps and normalized 2π radian wraps may include the A wrap and the F wrap, a fourth combination of measured 2π radian wraps and normalized 2π radian wraps may include the B wrap the D wrap, a fifth combination of measured 2π radian wraps and normalized 2π radian wraps may include the B wrap and the E wrap, a sixth combination of measured 2π radian wraps and normalized 2π radian wraps may include the B wrap and the F wrap, a seventh combination of measured 2π radian wraps and normalized 2π radian wraps may include the C wrap and the D wrap, an eighth combination of measured 2π radian wraps and normalized 2π radian wraps may include the C wrap and the E wrap and a ninth combination of measured 2π radian wraps and normalized 2π radian wraps may include the C wrap and the F wrap.

At 316, the configured processor may determine a number of normalized Δphase between signals that correspond to a same pulse 6 according to $$\varphi_0 = \varphi_1(\lambda_1/\lambda_0) + 2\pi k_1(\lambda_1/\lambda_1) - 2\pi k_0 \qquad \text{Equation 2:}$$

wherein $\varphi_0$ is the normalized phase between two signals that correspond to a same pulse 6, $\varphi_1$ is the measured Δphase between the two signals that correspond to the same pulse 6, $\lambda_1$ is the measured wavelength of one of the two signals that correspond to the same pulse 6, $\lambda_0$ is the normalized wavelength of one of the two signals that correspond to the same pulse 6, $k_1$ is a number of measured 2π radian wraps between the two signals that correspond to the same pulse 6 from one of the determined combinations of measured 2π radian wraps and normalized 2π radian wraps and $k_0$ is a number of normalized 2π radian wraps between the two signals from the same combination of measured 2π radian wraps and normalized 2π radian wraps.

Figure 4:
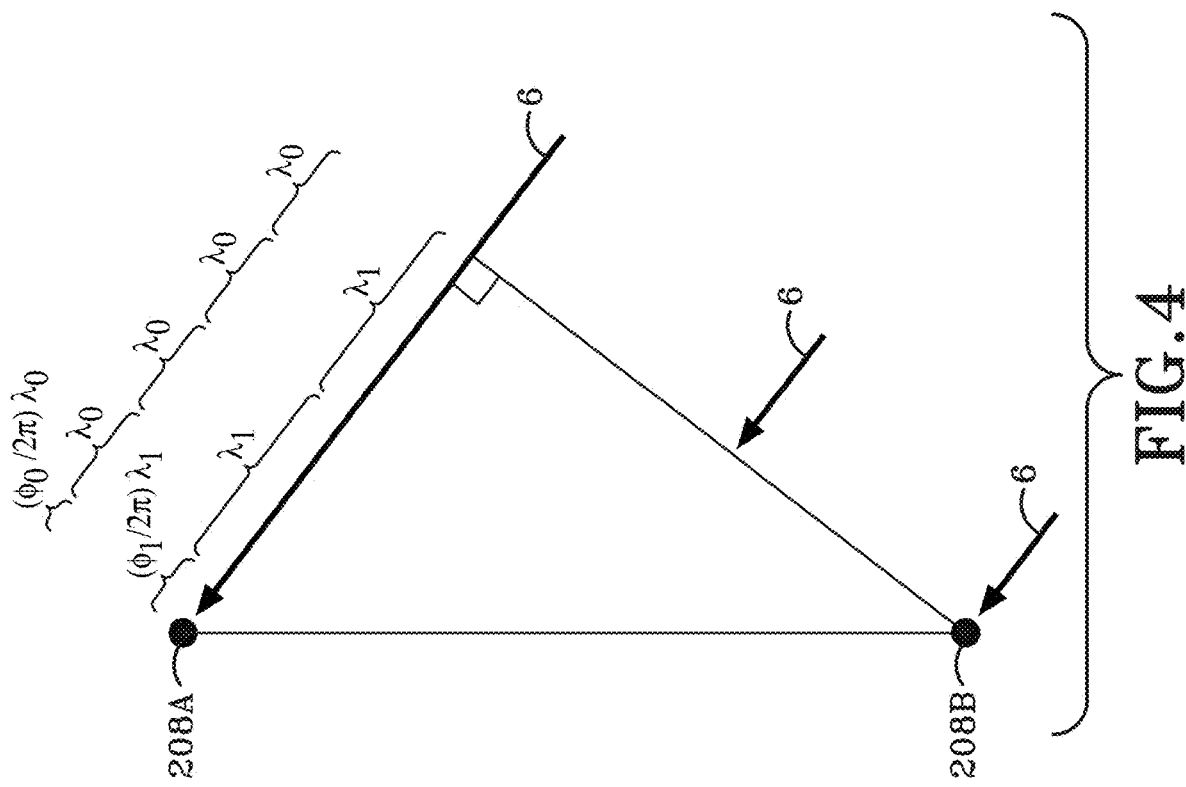
FIG. 4 (FIG. 4) depicts a first receiving element and a second receiving element of the antenna array depicted in FIG. 2 capturing a radio wave pulse from a radio wave transmitter depicted in FIG FIG. 5 (FIG. 5) depicts a number of radio wave pulses arriving at the antenna array depicted in FIG. 2.

FIG. 4 depicts the relationship denoted in Equation 2. That is, FIG. 4 shows that a measured Δphase ($\varphi_1$) that undergoes a given number of measured 2π radian wraps ($k_1$) is equal to a normalized Δphase ($\varphi_0$) that undergoes a given number of normalized 2π radian wraps ($k_0$). For example, as depicted in FIG. 4, a first receiving element 208A and a second receiving element 206B capture a pulse 6. Here, the measured Δphase that undergoes two 2π radian wraps is equal to a normalized Δphase that corresponds to the same pulse 6 that undergoes four 2π radian wraps.

In one example, the configured processor may determine eight possible combinations of measured 2π radian wraps and normalized 2π radian wraps. In this example one of the combinations may include an A wrap that is a first measured wrap and a D wrap that is a second normalized wrap. As such, when determining the normalized phase for the combination that includes the A wrap and the D wrap, $k_1$ is equal to one and $k_0$ is equal to two. In another example, the configured processor may determine nine possible combinations of measured 2π radian wraps and normalized 2π radian wraps. In this example, one of the combinations may include a B wrap that is a second measured wrap and an F wrap that is a third normalized wrap. As such, when determining the normalized phase for the combination that includes the B wrap and the F wrap $k_1$ is equal to two and $k_0$ is equal to three.

The configured processor may determine a normalized Δphase for all of the determined combinations of 2π radian wraps that correspond to a same pulse 6.

In one example, the antenna array 206 captures a first pulse 6A, a second pulse 6B, a third pulse 6C, and a fourth pulse 6D. In this example, the configured processor may determine six possible combinations of measured 2π radian wraps and normalized 2π radian wraps that correspond to the first pulse 6A, six possible combinations of measured 2π radian wraps and normalized 2π radian wraps that correspond to the second pulse 6B, eight possible combinations of measured 2π radian wraps and normalized 2π radian wraps that correspond to the third pulse 6C, and nine possible combinations of measured 2π radian wraps and normalized 2π radian wraps that correspond to the fourth pulse 6D. As such, the configured processor may determine six normalized Δphase corresponding to the first pulse 6A, six normalized Δphase corresponding to the second pulse 6B, eight normalized Δphase corresponding to the third pulse 6C, and nine normalized Δphase corresponding to the fourth pulse 6D.

In another example, the antenna array 206 captures a first pulse 6A, a second pulse 6B, and a third pulse 6C. In this example, the configured processor may determine six possible combinations of measured 2π radian wraps and normalized 2π radian wraps that correspond to the first pulse 6A, eight possible combinations of measured 2π radian wraps and normalized 2π radian wraps that correspond to the second pulse 6B, and ten possible combinations of measured 2π radian wraps and normalized 2π radian wraps that correspond to the third pulse 6C. As such, the configured processor may determine six normalized Δphase corresponding to the first pulse 6A, eight normalized Δphase corresponding to the second pulse 6B, and ten normalized Δphase corresponding to the third pulse 6C.

At 318, the configured processor may select a normalized Δphase that corresponds to a pulse 6 and a normalized Δphase that corresponds to a different pulse 6 and may determine if the selected normalized Δphase are equal.

In one example, the configured processor may determine four normalized Δphase (a first normalized Δphase, a second normalized Δphase, a third normalized Δphase, and a fourth normalized Δphase) that correspond to a first pulse 6A. The configured processor may further determine four normalized Δphase (a fifth normalized Δphase, a sixth normalized Δphase, a seventh normalized Δphase, and an eighth normalized Δphase) that correspond to a second pulse 6B. In this example, the configured processor may select the first normalized Δphase and the fifth normalized Δphase and may determine that the first normalized Δphase is equal to the fifth normalized Δphase.

In another example, the configured processor determines four normalized Δphase (a first normalized Δphase, a second normalized Δphase, a third normalized Δphase, and a fourth normalized Δphase) that corresponds to a first pulse 6A. The configured processor may further determine six normalized Δphase (a fifth normalized Δphase, a sixth normalized Δphase, a seventh normalized Δphase, an eighth normalized Δphase, a ninth normalized Δphase, and a tenth normalized Δphase) that correspond to a third pulse 6C. In this example, the configured processor may select the second normalized Δphase and the seventh normalized Δphase and may determine that the second normalized Δphase is not equal to the seventh normalized Δphase.

If at 318, the configured processor does not determine that the selected normalized Δphase are not equal, then the configured processor may proceed to 320. At 320 the configured processor may determine if there is at least one normalized Δphase corresponding to a pulse 6 remaining for comparison at 318.

In one example, the configured processor determines four normalized Δphase (a first normalized Δphase, a second normalized Δphase, a third normalized Δphase, and a fourth normalized Δphase) that corresponds to a first pulse 6A. The configured processor may further determine four normalized Δphase (a fifth normalized Δphase, a sixth normalized Δphase, a seventh normalized Δphase, and an eighth normalized Δphase) that correspond to a second pulse 6B. In this example, at 318, the configured processor may have determined that the first normalized Δphase is not equal to the fifth normalized Δphase, the sixth normalized Δphase, the seventh normalized Δphase, or the eighth normalized Δphase. As such, the configured processor may determine that the at least one normalized Δphase corresponding to a pulse 6 remains for comparison at 318 as the configured processor has not determined if the second normalized Δphase is equal to normalized Δphases 5-8, has not determined if the third normalized Δphase is equal to normalized Δphases 5-8, and has not determined if the fourth normalized Δphase is equal to normalized Δphases 5-8.

In another example, the configured processor determines six normalized Δphase (a first normalized Δphase, a second normalized Δphase, a third normalized Δphase, a fourth normalized Δphase, fifth normalized Δphase, and a sixth normalized Δphase) that corresponds to a second pulse 6B. The configured processor may further determine four normalized Δphase (a seventh normalized Δphase, an eighth normalized Δphase, a ninth normalized Δphase, and a tenth normalized Δphase) that correspond to a fourth pulse 6D. In this example, at 318, the configured processor may have determined that none of the first normalized Δphase, the second normalized Δphase, the third normalized Δphase, and the fourth normalized Δphase are equal to any of the seventh normalized Δphase, the eighth normalized Δphase, the ninth normalized Δphase, or the tenth normalized Δphase. Accordingly, at 320 the configured processor may determine there is not at least one remaining normalized Δphase.

If at 320, the configured processor determines there is at least one normalized Δphase that correspond to either pulse 6 remaining for comparison at 318, then the configured processor may proceed to 318. At 318 the configured processor may determine if a remaining normalized Δphase that corresponds to one pulse 6 is equal to another normalized Δphase that corresponds to another pulse 6.

If at 320 the configured processor does not determine that there is at least one normalized Δphase remaining for comparison at 318, then the configured processor may proceed to 322. At 322 the configured processor may not correlate the pulses 6 and may determine that the pulses 6 originate from different transmitters 4.

In one example, the configured processor determines six normalized Δphase that correspond to a first pulse 6A and eight normalized Δphase that correspond to a second pulse 6B. In this example, the configured processor may determine that none of the six normalized Δphase corresponding to the first pulse 6A are equal to any of the eight normalized Δphase corresponding to the second pulse 6B and as such, may determine are no remaining normalized Δphase for comparison. Accordingly, the configured processor may not correlate the first pulse 6A and the second pulse 6B and may determine that the first pulse 6A and the second pulse 6B originate from different transmitters 4. In another example, the configured processor may determine four normalized Δphase that correspond to a first pulse 6A and four normalized Δphase that correspond to a third pulse 6C. In this example, the configured processor may determine that none of the four normalized Δphase corresponding to the first pulse 6A are equal to any of the four normalized Δphase corresponding to the second pulse 6B and as such may determine there are no remaining normalized Δphase for comparison. Accordingly, the configured processor may not correlate the first pulse 6A and the third pulse 6C and may determine that the first pulse 6A and the third pulse 6C originate from different transmitters 4.

If at 318, the configured processor determines one normalized Δphase that corresponds to one pulse 6 is the equal to another normalized Δphase that corresponds to another pulse 6, then the configured processor may proceed to 324. At 324, the configured processor may correlate each pulse 6 as originating from a same transmitter 4.

In one example, the configured processor may have determined a first normalized Δphase that corresponds to a first pulse 6A is equal to a second Δphase that corresponds to a second pulse 6B. In this example, the configured processor may correlate the first pulse 6A and the second pulse 6B as originating from a same transmitter 4. In another example, the configured processor may have determined a first normalized Δphase that corresponds to a first pulse 6A is equal to a second Δphase that corresponds to a second pulse 6B and is equal to a third normalized Δphase that corresponds to a third pulse 6C. In this example, the configured processor may correlate the first pulse 6A, the second pulse 6B, and the third pulse 6C as originating from a same transmitter 4.

At 326, the configured processor determines information about a transmitter 4 that emits the correlated pulses 6. The configured processor may determine information about the transmitter 4 by processing one or more signals that correspond to one or more pulses 6. The information about the transmitter 4 may include a location of the transmitter 4 that emits the correlated pulses 6, a type of transmitter that emits the correlated pulses 6, etc.

In one example, the configured processor determines a location of the transmitter 4 that emits the correlated pulses 6 by processing a subset of signals that correspond to a correlated pulse 6 to determine an angle of arrival of the correlated pulse 6. The configured processor may then determine a location of the transmitter 4 that emitted the correlated pulse 6 as a function of the determined angle of arrival.

In one example, the configured processor correlates a first pulse 6A, a second pulse 6B, a third pulse 6C, and a fourth pulse 6D as originating from a first transmitter 4 and may correlate a fifth pulse 6E, a sixth pulse 6F, a seventh pulse 6G, and an eighth pulse 6H as originating from a second transmitter 4. In this example, the configured processor may process a signal that corresponds to the first pulse 6A to determine an angle of arrival of the first pulse 6A. The configured processor may then determine a location of the first transmitter 4 as a function of the determined angle of arrival of the first pulse 6A. Furthermore, the configured processor may process a signal that corresponds to the seventh pulse 6G to determine an angle of arrival of the seventh pulse 6G. The configured processor may then determine a location of the second transmitter 4 as a function of the determined angle of arrival of the seventh pulse 6G.

In another example, the configured processor correlates a first pulse 6A and a second pulse 6B as originating from a first transmitter 4 and may correlate a third pulse 6C, a fourth pulse 6D, and a fifth pulse 6E as originating from a second transmitter 4. In this example, the configured processor may process a signal corresponding to the second pulse 6B to determine an angle of arrival of the second pulse 6B. The configured processor may then determine a location of the first transmitter 4 as a function of the determined angle of arrival of the second pulse 6B. Furthermore, the configured processor may process a signal that corresponds to the fourth pulse 6D to determine an angle of arrival of the fourth pulse 6D. The configured processor may then determine a location of the second transmitter 4 as a function of the determined angle of arrival of the fourth pulse 6D.

The configured processor may determine a type of transmitter 4 that emitted correlated pulses 6 by processing a subset of signals that correspond to a correlated pulse 6. In one example, the configured processor may correlate a first pulse 6A and a second pulse 6B as originating from a first transmitter 4. In this example the configured processor may determine what type of radar transmitter the first transmitter 4 is by processing a signal that corresponds to the first pulse 6A. In another example, the configured processor may correlate a first pulse 6A, a second pulse 6B, and a third pulse 6C as originating from a second transmitter 4. In this example the configured processor may determine what type of radar transmitter 4 the second transmitter 4 is by processing a signal that corresponds to the third pulse 6C.

If at 310 the configured processor determined a number of measured $2\pi$ radian wraps between two signals that correspond to a same pulse 6, then the configured processor may proceed to 328. If the configured processor did not determine a number of measured $2\pi$ radian wraps between two signals that correspond to a same pulse 6, then the configured processor may proceed to 310. At 328, the configured processor may determine a number of normalized $2\pi$ radian wraps between two signals that correspond to a same pulse 6. The configured processor may determine a number of normalized $2\pi$ r radian wraps between two signals as a function of the determined measured $\Delta$phase between signals that correspond to a same pulse 6, a distance between to receiving elements 208, one of which is a reference element, that correspond to the two signals, and the normalized frequency of the two signals.

In one example, the antenna array 206 includes a first receiving element 208A, a second receiving element 208B, a third receiving element 208C, and a fourth receiving element 208D. In this example, the receiving elements 208A-D may capture a first pulse 6A and a second pulse 6B and a user may select the first receiving element 208A as the reference element. As such, the configured processor may receive four signals, a first signal from the first receiving element 208A, a second signal from the second receiving element 208B, a third signal from the third receiving element 208C, and a fourth signal from the fourth receiving element 208D that correspond to the first pulse 6A and four signals, a fifth signal from the first receiving element 208A, a sixth signal from the second receiving element 208B, a seventh signal from the third receiving element 208C, and an eighth signal from the fourth receiving element 208D that correspond to the second pulse 6B.

In this example, the configured processor determines a first measured $\Delta$phase between the first signal and the second signal, a second measured $\Delta$phase between the first signal and the third signal, a third measured $\Delta$phase between the first signal and the fourth signal, a fourth measured $\Delta$phase between the fifth signal and the sixth signal, a fifth measured $\Delta$phase between the fifth signal and the seventh signal, and a sixth measured $\Delta$phase between the fifth signal and the eighth signal.

In this example, the configured processor determines a first number of normalized $2\pi$ radian wraps between the first signal and the second signal as a function of the first measured $\Delta$phase, the second measured $\Delta$phase, and the third measured $\Delta$phase, a distance between the first receiving element 208A and the second receiving element 208B, and the normalized frequency of the first signal and the second signal as the first signal and the second signal correspond to the same first pulse 6A and the first measured $\Delta$phase, the second measured $\Delta$phase, and the third measured $\Delta$phase correspond to the same first pulse 6A. The configured processor may similarly determine a second number of normalized $2\pi$ radian wraps between the first signal and the third signal, and a third number normalized of $2\pi$ radian wraps between first signal and the fourth signal.

The configured processor may further determine a fourth number of normalized $2\pi$ radian wraps between the fifth signal and the sixth signal as a function of the fourth measured $\Delta$phase, the fifth measured $\Delta$phase, and the sixth measured $\Delta$phase, a distance between the first receiving element 208A and the second receiving element 208B, and the normalized frequency of the first signal and the second signal as the first signal and the second signal correspond to the same second pulse 6B and the third measured $\Delta$phase, the fourth measured $\Delta$phase, and the fifth measured $\Delta$phase correspond to the same second pulse 6B. The configured processor may similarly determine a fifth number of normalized $2\pi$ radian wraps between the fifth signal and the seventh signal, and a sixth number of normalized $2\pi$ radian wraps between fifth signal and the eighth signal.

In another example, the antenna array 206 includes a first receiving element 208A, a second receiving element 208B, a third receiving element 208C, a fourth receiving element 208D, a fifth receiving element 208E, and a sixth receiving element 208F. In this example, the receiving elements 208A-F may capture a first pulse 6A and as such, the configured processor may receive six signals, one from each receiving element 208A-F. A user may select the third receiving element 208C as the reference receiving element and may determine a first measured $\Delta$phase between a third signal from the third receiving element 208C and a first signal from the first receiving element 208A, a second measured $\Delta$phase between the third signal and a second signal from the second receiving element 208B, a third measured $\Delta$phase between the third signal and a fourth signal from the fourth receiving element 208D, a fourth measured $\Delta$phase between the third signal and a fifth signal from the fifth receiving element 208E, and a fifth measured $\Delta$phase between the third signal and a sixth signal from the sixth receiving element 208F.

In this example, the configured processor determines a first number of normalized $2\pi$ radian wraps between the third signal and the first signal as a function of the first measured $\Delta$phase, the second measured $\Delta$phase, the third measured $\Delta$phase, the fourth measured $\Delta$phase, and the fifth measured $\Delta$phase, a distance between the third receiving element 208C and the first receiving element 208A, and the normalized frequency of the third signal and the first signal as the third signal is from the reference receiving element 208C, the third signal and the first signal correspond to the same first pulse 6A and the first measured Δphase, the second measured Δphase, the third measured Δphase, the fourth measured Δphase, and the fifth measured Δphase correspond to the first pulse 6A. The configured processor may similarly determine a second number of normalized 2π radian wraps between the third signal and the second signal, a third number of normalized 2π radian wraps between the third signal and the fourth signal, a fourth number of normalized 2π radian wraps between the third signal and the fifth signal, and a fifth number of normalized 2π radian wraps between the third signal and the sixth signal.

At 330, the configured processor may determine a number of normalized Δphase for each captured pulse 6. The configured processor may determine a normalized Δphase according to Equation 2 wherein $\varphi_0$ is the normalized phase between two signals that correspond to a same pulse 6, $\varphi_1$ is the measured Δphase between the two signals that correspond to the same pulse 6, $\lambda_1$ is the measured wavelength of one of the two signals that correspond to the same pulse 6, $\lambda_0$ is the normalized wavelength of one of the two signals that correspond to the same pulse 6, $k_1$ is the number of measured 2π radian wraps between the two signals that correspond to the same pulse 6 from and $k_0$ is the number of normalized 2π radian wraps between the two signals that correspond to the same pulse 6.

In one example, the antenna array 206 includes a first receiving element 208A, a second receiving element 208B, a third receiving element 208C, and a fourth receiving element 208D. In this example the receiving elements 208A-208D may each capture a first pulse 6A. As such, the configured processor may receive a first signal corresponding to the first pulse 6A including a first measured frequency and a first measured wavelength from the first receiving element 208A, a second signal corresponding to the first pulse 6A including a second measured frequency and a second measured wavelength from the second receiving element 208B, a third signal corresponding to the first pulse 6A including a third measured frequency and a third measured wavelength from the third receiving element 208C, and a fourth signal corresponding to the first pulse 6A including a fourth measured frequency and a fourth measured wavelength from the fourth receiving element 208D.

The configured processor may normalize the first measured frequency and the first measured wavelength to a first normalized frequency and a first normalized wavelength as described herein, may normalize the second measured frequency and second measured wavelength to a second normalized frequency and a second normalized wavelength as described herein, may normalize the third measured frequency and the third measured wavelength to a third normalized frequency and a third normalized wavelength as described herein, and may normalize the fourth measured frequency and the fourth measured wavelength to a fourth normalized frequency and a fourth normalized wavelength as described herein.

In this example, a user selects the first receiving element 208A as the reference receiving element and may determine a first measured Δphase between the first signal and the second signal as described herein, may determine a second measured Δphase between the first signal and the third signal as described herein, may determine a third measured Δphase between the first signal and the fourth signal as described herein.

The configured processor may further determine a first number of measured 2π radian wraps between the first signal and the second signal as described herein, a second number of measured 2π radian wraps between the first signal and the third signal as described herein, and a third number of measured 2π radian wraps between the first signal and the fourth signal as described herein. The configured processor may further determine a first number of normalized 2π radian wraps between the first signal and the second signal as described herein, a second number of normalized 2π radian wraps between the first signal and the third signal as described herein, and a third number of normalized 2π radian wraps between the first signal and the fourth signal as described herein.

The configured processor may then determine a first normalized Δphase as a function of the first measured frequency, the first measured wavelength, the first normalized frequency, the first normalized wavelength, the first measured Δphase, the first number of measured 2π radian wraps, and the first number of normalized 2π radian wraps according to Equation 2. The configured processor may similarly determine a second normalized Δphase as a function of the first measured frequency, the first measured wavelength, the first normalized frequency, the first normalized wavelength, the second measured Δphase, the second number of measured 2π radian wraps, and the second number of normalized 2π radian wraps. The configured processor may similarly determine a third normalized Δphase as a function of the first measured frequency, the first measured wavelength, the first normalized frequency, the first normalized wavelength, the third measured Δphase, the third number of measured 2π radian wraps, and the third number of normalized 2π radian wraps.

In another example, the antenna array 206 includes a first receiving element 208A, a second receiving element 208B, a third receiving element 208C, a fourth receiving element 208D, a fifth receiving element 208E, and a sixth receiving element 208F that each capture a first pulse 6A. As such, the configured processor may receive a first signal corresponding to the first pulse 6A including a first measured frequency and a first measured wavelength from the first receiving element 208A, may receive a second signal including corresponding to the first pulse 6A including a second measured frequency and a second measured wavelength from the second receiving element 208B, may receive a third signal corresponding to the first pulse 6A including a third measured frequency and a third measured wavelength from the third receiving element 208C, may receive a fourth signal corresponding to the first pulse 6A including a fourth measured frequency and a fourth measured wavelength from the fourth receiving element 208D, may receive a fifth signal corresponding to the first pulse 6A including a fifth measured frequency and a fifth measured wavelength from the fifth receiving element 208E, and may receive a sixth signal corresponding to the first pulse 6A including a sixth measured frequency and a sixth measured wavelength from the sixth receiving element 208F.

The configured processor may normalize the first measured frequency and the first measured wavelength to a first normalized frequency and a first normalized wavelength as described herein, may normalize the second measured frequency and second measured wavelength to a second normalized frequency and a second normalized wavelength as described herein, may normalize the third measured frequency and the third measured wavelength to a third normalized frequency and a third normalized wavelength as described herein, may normalize the fourth measured frequency and the fourth measured wavelength to a fourth normalized frequency and a fourth normalized wavelength as described herein, may normalize the fifth measured frequency and the fifth measured wavelength to a fifth normalized frequency and a fifth normalized wavelength as described herein, and may normalize the sixth measured frequency and the sixth measured wavelength to a sixth normalized frequency and a sixth normalized wavelength as described herein.

In this example, a user selects the fourth receiving element 208D as the reference receiving element and may determine a first measured Δphase between the fourth signal and the first signal as described herein, may determine second measured Δphase between the fourth signal and the second signal as described herein, may determine a third measured Δphase between the fourth signal and the third signal as described herein, may determine a fourth measured Δphase between the fourth signal and the fifth signal as described herein, and may determine a fifth measured Δphase between the fourth signal and the sixth signal as described herein.

The configured processor may further determine a first number of measured 2π radian wraps between the fourth signal and the first signal as described herein, a second number of measured 2π radian wraps between the fourth signal and the second signal as described herein, a third number of measured 2π radian wraps between the fourth signal and the third signal as described herein, a fourth number of measured 2π radian wraps between the fourth signal and the fifth signal as described herein, and a fifth number of measured 2π radian wraps between the fourth signal and the sixth signal as described herein. The configured processor may further determine first number of normalized 2π radian wraps between the fourth signal and the first signal as described herein, a second number of normalized 2π radian wraps between the fourth signal and the second signal as described herein, a third number of normalized 2π radian wraps between the fourth signal and the third signal as described herein, a fourth number of normalized 2π radian wraps between the fourth signal and the fifth signal as described herein, and a fifth number of normalized 2π radian wraps between the fourth signal and the sixth signal as described herein.

The configured processor may then determine a first normalized Δphase as a function of the fourth measured frequency, the fourth measured wavelength, the fourth normalized frequency, the fourth normalized wavelength, the first measured Δphase, the first number of measured 2π radian wraps, and the first number of normalized 2π radian wraps accordingly to Equation 2. The configured processor may similarly determine a second normalized Δphase as a function of the fourth measured frequency, the fourth measured wavelength, the fourth normalized frequency, the fourth normalized wavelength, the second measured Δphase, the second number of measured 2π radian wraps, and the second number of normalized 2π radian wraps. The configured processor may similarly determine a third normalized Δphase as a function of the fourth measured frequency, the fourth measured wavelength, the fourth normalized frequency, the fourth normalized wavelength, the third measured Δphase, the third number of measured 2π radian wraps, and the third number of normalized 2π radian wraps The configured processor may similarly determine a fourth normalized Δphase as a function of the fourth measured frequency, the fourth measured wavelength, the fourth normalized frequency, the fourth normalized wavelength, the fourth measured Δphase, the fourth number of measured 2π radian wraps, and the fourth number of normalized 2π radian wraps. The configured processor may similarly determine a fifth normalized Δphase as a function of the fourth measured frequency, the fourth measured wavelength, the fourth normalized frequency, the fourth normalized wavelength, the fifth measured Δphase, the fifth number of measured 2π radian wraps, and the fifth number of normalized 2π radian wraps At 332 the configured processor may determine if each normalized Δphase of a pulse 6 are equal to a corresponding normalized Δphase of another pulse 6.

In one example, the antenna array 206 includes a first receiving element 208A, a second receiving element 208B, a third receiving element 208C, and a fourth receiving element 208D. The receiving elements 208A-D may each capture a first pulse 6A and a second pulse 6B. The configured processor may receive a first signal corresponding to the first pulse 6A from the first receiving element 208A, a second signal corresponding to the first pulse 6A from the second receiving element 208B, a third signal corresponding to the first pulse 6A from the third receiving element 208C, and a fourth signal corresponding to the first pulse 6A from the fourth receiving element 208D. The configured processor may further receive a fifth signal corresponding to the second pulse 6B from the first receiving element 208A, a sixth signal corresponding to the second pulse 6B from the second receiving element 208B, a seventh signal corresponding to the second pulse 6B from the third receiving element 208C, and an eighth signal corresponding to the second pulse 6B from the fourth receiving element 208D.

In this example, a user selects the first receiving element 208A as the reference receiving element and may determine a first normalized Δphase between the first signal and the second signal as described herein, may determine a second normalized Δphase between the first signal and the third signal as described herein, and may determine a third normalized Δphase between the first signal and the fourth signal as described herein. The first normalized Δphase, the second normalized Δphase, and the third normalized Δphase correspond to the first pulse 6A as the first normalized Δphase, the second normalized Δphase, and the third normalized Δphase are determined as a function of the first signal, the second signal, the third signal, and the fourth signal.

The configured processor may further determine a fourth normalized Δphase between the fifth signal and the sixth signal as described herein, may determine a fifth normalized Δphase between the fifth signal and the seventh signal as described herein, and may determine a sixth normalized Δphase between the fifth signal and the eighth signal. The fourth normalized Δphase, the fifth normalized Δphase, the sixth normalized Δphase, and the seventh normalized Δphase correspond to the second pulse 6B as the fourth normalized Δphase, the fifth normalized Δphase, and the sixth normalized Δphase are determined as a function of the fourth signal, the fifth signal, the sixth signal, the seventh signal, and the eighth signal.

The configured processor may then determine if the first normalized Δphase is equal to the fourth normalized Δphase as the first normalized Δphase and the fourth normalized Δphase each correspond to signals from the first receiving element 208A and the second receiving element 208B, may determine if second normalized Δphase is equal to the fifth normalized Δphase as the second normalized Δphase and the fifth normalized Δphase each correspond to signals from the first receiving element 208A and the third receiving element 208C, and may determine if the third normalized Δphase is equal to the sixth normalized Δphase as the first normalized Δphase and the sixth normalized Δphase each correspond to signals from the first receiving element 208A and the fourth receiving element 208D.

In this example, the first normalized Δphase and the fourth normalized Δphase have the same value, the second normalized Δphase and the fifth normalized Δphase have the same value, and the third normalized Δphase and the sixth normalized Δphase have the same value. As such, the configured processor may determine the first normalized Δphase is equal to the fourth normalized Δphase, may determine the second normalized Δphase is equal to the fifth normalized Δphase and may determine the third normalized Δphase is equal to the sixth normalized Δphase.

In another example, the antenna array 206 includes a first receiving element 208A, a second receiving element 208B, a third receiving element 208C, and a fourth receiving element 208D. In this example, the receiving elements 208A-D may capture a first pulse 6A and a second pulse 6B. As such, the configured processor may receive a first signal corresponding to the first pulse 6A from the first receiving element 208A, a second signal corresponding to the first pulse 6A from the second receiving element 208B, a third signal corresponding to the first pulse 6A from the third receiving element 208C, and a fourth signal corresponding to the first pulse 6A from the fourth receiving element 208D. The configured processor may further receive a fifth signal corresponding to the second pulse 6B from the first receiving element 208A, a sixth signal corresponding to the second pulse 6B from the second receiving element 208B, a seventh signal corresponding to the second pulse 6B from the third receiving element 208C, and an eighth signal corresponding to the second pulse 6B from the fourth receiving element 208D.

In this example, a user selects the second receiving element 208B as the reference receiving element and may determine a first normalized Δphase between the second signal and the first signal as described herein, may determine a second normalized Δphase between the second signal and the third signal as described herein, and may determine a third normalized Δphase between the second signal and the fourth signal as described herein. The first normalized Δphase, the second normalized Δphase, and the third normalized Δphase correspond to the first pulse 6A as the first normalized Δphase, the second normalized Δphase, and the third normalized Δphase are determined as a function of the first signal, the second signal, the third signal, and the fourth signal.

The configured processor may further determine a fourth normalized Δphase between the sixth signal and the fifth signal as described herein, may determine a fifth normalized Δphase between the sixth signal and the seventh signal, and may determine a sixth normalized Δphase between the sixth signal and the eighth signal as described herein. The fourth normalized Δphase, the fifth normalized Δphase, and the sixth normalized Δphase correspond to the second pulse 6B as the fourth normalized Δphase, the fifth normalized Δphase, and the sixth normalized Δphase are determined as a function of the fifth signal, the sixth signal, the seventh signal, and the eighth signal.

The configured processor may then determine if the first normalized Δphase is equal to the fourth normalized Δphase as the first normalized Δphase and the fourth normalized Δphase each correspond to signals from the second receiving element 208B and the first receiving element 208A, may determine if the second normalized Δphase is equal to the fifth normalized Δphase as the second normalized Δphase and the fifth normalized Δphase each correspond to signals from the second receiving element 208B and the third receiving element 208C, and may determine if the third normalized Δphase is equal to the sixth normalized Δphase as the third normalized Δphase and the sixth normalized Δphase correspond to signals from the second receiving element 208B and the fourth receiving element 208D.

In this example, the first normalized Δphase and the fourth normalized normalized Δphase have the same value, the second normalized Δphase and the fifth normalized Δphase have different values, and the third normalized Δphase and the sixth normalized Δphase have different values. As such, the configured processor may determine the first normalized Δphase is equal to the fourth normalized Δphase, determines that the second normalized Δphase is not equal to the fifth normalized Δphase, and determines that the third is normalized Δphase is not equal to the sixth normalized Δphase.

In yet another example, the antenna array 206 includes a first receiving element 208A, a second receiving element 208B, a third receiving element 208C, and a fourth receiving element 208D. In this example, the receiving elements 208A-D may capture a first pulse 6A and a second pulse 6B. As such, the configured processor may receive a first signal corresponding to the first pulse 6A from the first receiving element 208A, a second signal corresponding to the first pulse 6A from the second receiving element 208B, a third signal corresponding to the first pulse 6A from the third receiving element 208C, and a fourth signal corresponding to the first pulse 6A from the fourth receiving element 208D. The configured processor may further receive a fifth signal corresponding to the second pulse 6B from the first receiving element 208A, a sixth signal corresponding to the second pulse 6B from the second receiving element 208B, a seventh signal corresponding to the second pulse 6B from the third receiving element 208C, and an eighth signal corresponding to the second pulse 6B from the fourth receiving element 208D.

In this example, a user selects the third receiving element 208C as the reference receiving element and may determine a first normalized Δphase between the third signal an the first signal as described herein, may determine a second normalized Δphase between the third signal and the second signal as described herein, and may determine a third normalized Δphase between the third signal and the fourth signal as described herein. The first normalized Δphase, the second normalized Δphase, and the third normalized Δphase correspond to the first pulse 6A as the first normalized Δphase, the second normalized Δphase, and the third normalized Δphase are determined as a function of the first signal, the second signal, the third signal, and the fourth signal.

The configured processor may then determine a fourth normalized Δphase between the seventh signal and the fifth signal as described herein, may determine a fifth normalized Δphase between the seventh signal and the sixth signal as described herein, and may determine a sixth normalized Δphase between the seventh signal and the eighth signal as described herein. The fourth normalized Δphase, the fifth normalized Δphase, and the sixth normalized Δphase correspond to the second pulse 6B as the fourth normalized Δphase, the fifth normalized Δphase, and the sixth normalized Δphase are determined as a function of the fifth signal, the sixth signal, the seventh signal and the eighth signal.

The configured processor may then determine if the first normalized Δphase is equal to the fourth normalized Δphase as the first normalized Δphase and the fourth normalized Δphase each correspond to signals from the third receiving element 208C and the first receiving element 208A, may determine if the second normalized Δphase is equal to the fifth normalized Δphase as the second normalized Δphase and the fifth normalized Δphase correspond to signals from the third receiving element 208C and the second receiving element 208B, and may determine if the third normalized Δphase is equal to the sixth normalized Δphase as the third normalized Δphase and the sixth normalized Δphase each correspond to signals from the third receiving element 208C and the fourth receiving element 208D.

In this example, the first normalized Δphase and the fourth normalized Δphase may have different values, the second normalized Δphase and the fifth normalized Δphase may have different values, and the third normalized Δphase and the sixth normalized Δphase may have different values. As such, the configured processor may determine the first normalized Δphase is not equal to the fourth normalized Δphase, may determine the second normalized Δphase is not equal to the fifth normalized Δphase, and may determine the third normalized Δphase is not equal to the sixth normalized Δphase.

If at 332 the configured processor does not determine that each normalized Δphase of a pulse 6 is equal to a corresponding normalized Δphase of a different pulse 6, then the configured processor may proceed to 334. At 334, the configured processor may not correlate the pulses 6 and may determine the pulses 6 originate from different transmitters 4.

In one example, the configured processor determines a first, second, and third normalized Δphase of a first pulse 6A and a fourth, fifth, and sixth normalized Δphase of a second pulse 6B as described herein. The first normalized Δphase may correspond to the fourth normalized Δphase, the second normalized Δphase may correspond to the fifth normalized Δphase, and the third normalized Δphase may correspond to the sixth normalized Δphase as described herein. In this example, the configured processor may determine the first normalized Δphase is equal to the fourth normalized Δphase, may determine the second normalized Δphase is equal to the fifth normalized Δphase, and may determine the third normalized Δphase is not equal to the sixth normalized Δphase. Accordingly, the configured processor may not correlate the first pulse 6A and 6B for further processing and determines the first pulse 6A and the second pulse 6B originate from different transmitters 4.

In another example, the configured processor determines a first, second, and third normalized Δphase of a first pulse 6A and a fourth, fifth, and sixth normalized Δphase of a second pulse 6B as described herein. The first normalized Δphase may correspond to the fourth normalized Δphase, the second normalized Δphase may correspond to the fifth normalized Δphase, and the third normalized Δphase may correspond to the sixth normalized Δphase as described herein. In this example, the configured processor may determine the first normalized Δphase is not equal to the fourth normalized Δphase, the second normalized Δphase is not equal to the fifth normalized Δphase, and the third normalized Δphase is not equal to the sixth normalized Δphase. Accordingly, the configured processor may not correlate the first pulse 6A and the second 6B and determines the first pulse 6A and the second pulse 6B originate from different transmitters 4.

If at 328 the configured processor determines that each normalized Δphase of a pulse 6 is equal to a corresponding normalized Δphase of a different pulse 6, then the configured processor may proceed to 336. At 336, the configured processor may correlate the pulses 6 and may determine the correlated pulses 6 originate from a same transmitter 4.

Figure 5:
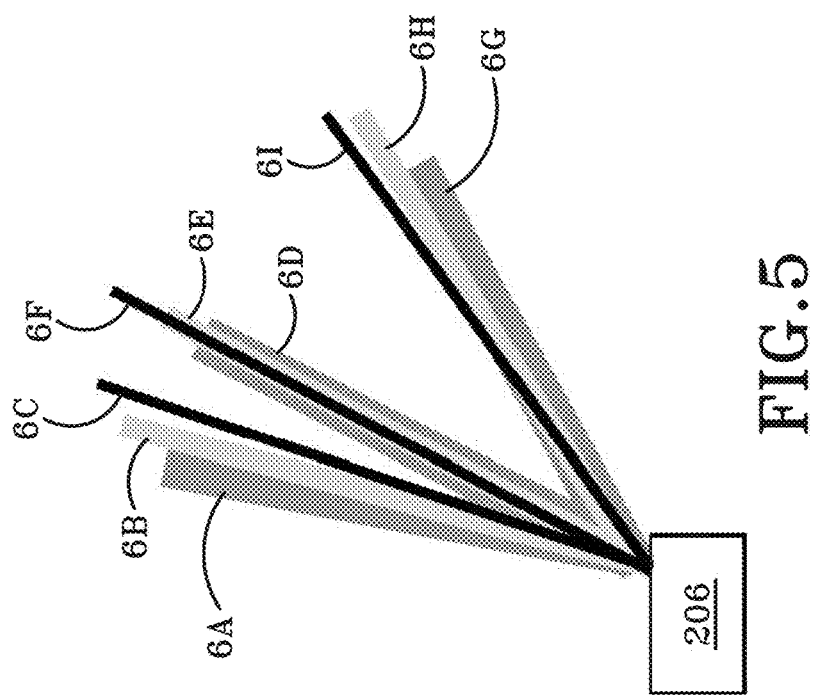

When multiple pulses 6 arrive at the antenna array 206 at the same angle, and therefore originate from the same transmitter 4, the normalized Δphase that correspond to the pulses 6 are all equal. FIG. 5 depicts a first pulse 6A, a second pulse 6B, a third pulse 6C, a fourth pulse 6D, a fifth pulse 6E, a sixth pulse 6F, a seventh pulse 6G, an eighth pulse 6H, and a ninth pulse 6I. In this instance only the fourth pulse 6D, the fifth pulse 6E, and the sixth pulse 6F arrive at the antenna array 206 at the same angle. In this instance, each normalized Δphase that corresponds to the fourth pulse 6D will be equal to each normalized Δphase that corresponds to the fifth pulse 6E and will be equal to each normalized Δphase that corresponds to the sixth pulse 6F. Accordingly, the configured processor correlates the fourth pulse 6D, the fifth pulse 6E, and the sixth pulse 6F as originating from the same transmitter 4.

Stated otherwise, when multiple normalized Δphase are equal, the corresponding pulses 6 arrive at the antenna array 206 at a same angle, and the configured processor determines the pulses 6 originate from a same transmitter 4. For example, the configured processor may determine a first set of normalized Δphase, a second set of normalized Δphase, and a third set of normalized Δphase. The first set of normalized Δphase includes a first normalized Δphase, a second normalized Δphase, and a third normalized Δphase. The second set of normalized Δphase includes a fourth normalized Δphase, a fifth normalized Δphase, and a sixth normalized Δphase. The third set of normalized Δphase includes a seventh normalized Δphase, an eighth normalized Δphase, and a ninth normalized Δphase. The first set of normalized Δphase and the third set of normalized Δphase correspond to pulses 6 that do not arrive at the antenna array 206 at the same angle. Accordingly, the first normalized Δphase, the second normalized Δphase, and the third normalized Δphase are not all equal and the seventh normalized Δphase, the eighth normalized Δphase, and the ninth normalized Δphase are not all equal.

In this example, the second set of normalized Δphase correspond to pulses 6 that arrive at the antenna array 206 at the same angle. In this instance, the fourth normalized Δphase, the fifth normalized Δphase, and the sixth normalized Δphase are all equal. Accordingly, the configured processor correlates the pulses 6 that correspond to the first normalized Δphase, the second normalized Δphase, and the third normalized Δphase as originating from the same transmitter 4.

In one example, the configured processor determines a first, a second, and a third normalized Δphase of a first pulse 6A and a fourth, fifth, and sixth normalized Δphase of a second pulse 6B as described herein. The first normalized Δphase may correspond to the fourth normalized Δphase, the second normalized Δphase may correspond to the fifth normalized Δphase, and the third normalized Δphase may correspond to the sixth normalized Δphase as described herein. In this example, the configured processor may determine the first normalized Δphase is equal to the fourth normalized Δphase, may determine the second normalized Δphase is equal to the fifth normalized Δphase, and may determine the third normalized Δphase is equal to the sixth normalized Δphase. Accordingly, the configured processor may correlate the first pulse 6A and the second pulse 6B and may determine the first pulse 6A and the second pulse 6B originate from a same transmitter 4.

In another example, the configured processor determines a first, a second, and a third normalized Δphase of a first pulse 6A, a fourth, fifth, and sixth normalized Δphase of a second pulse 6B, and a seventh, eighth, and a ninth normalized Δphase of third pulse 6C as described herein. The first normalized Δphase may correspond to the fourth normalized Δphase and the seventh normalized Δphase, the second normalized Δphase may correspond to the fifth normalized Δphase and the eighth normalized Δphase, and the third normalized Δphase may correspond to the sixth normalized Δphase and the ninth normalized Δphase as described herein. In this example, the configured processor may determine the first normalized Δphase, the fourth normalized Δphase, and the seventh normalized Δphase are equal, may determine the second normalized Δphase, the fifth normalized Δphase, and the eighth normalized Δphase are equal, and may determine the third normalized Δphase, the sixth normalized Δphase, and the ninth normalized Δphase are equal. Accordingly, the configured processor may correlate the first pulse 6A, the second pulse 6B, and the third pulse 6C and may determine the first pulse 6A, the second pulse 6B, and the third pulse 6C originate from a same transmitter 4.

In yet another example the configured processor determines a first normalized Δphase, a second normalized Δphase, and a third normalized Δphase of a first pulse 6A, and a fourth normalized Δphase, a fifth normalized Δphase, and a sixth normalized Δphase of a second pulse 6B as described herein. The configured processor may further determine a seventh normalized Δphase, an eighth normalized Δphase, and a ninth normalized Δphase of a third pulse 6C and a tenth normalized Δphase, an eleventh normalized Δphase, and a twelfth normalized Δphase of a fourth pulse 6D. In this example, the first normalized Δphase may correspond to the fourth normalized Δphase, the seventh normalized Δphase, and the tenth normalized Δphase, the second normalized Δphase, may correspond to the fifth normalized Δphase, the eighth normalized Δphase, and the eleventh normalized Δphase, and the third normalized Δphase may correspond to the sixth normalized Δphase, the ninth normalized Δphase, and the twelfth normalized Δphase as described herein.

In this example, the configured processor determines the first normalized Δphase is equal to the fourth normalized Δphase is equal to the fourth normalized Δphase and not equal to the seventh normalized Δphase or the tenth normalized Δphase, may determine the second normalized Δphase is equal to the fifth normalized Δphase and not equal to the eighth normalized Δphase or the eleventh normalized Δphase, and may determine the third normalized Δphase is equal to the sixth normalized Δphase and not equal to the ninth normalized Δphase or the twelfth normalized Δphase. The configured processor may further determine the seventh normalized Δphase is equal to the tenth normalized Δphase, the eighth normalized Δphase is equal to the eleventh normalized Δphase, and the ninth normalized Δphase is equal to the twelfth normalized Δphase. Accordingly, the configured processor may correlate the first pulse 6A and the second pulse 6B as a first set of correlated pulses 6 and may correlate the third pulse 6C and the fourth pulse 6D as a second set of correlated pules 6.

After correlating different pulses 6 at 336, the configured processor may proceed to 326. At 326, the configured processor may determine information about a transmitter 4 that emits the correlated pulses 6 as discussed herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer-implemented method for automatically correlating radio wave pulses comprising:
   determining a first plurality of normalized phase shifts that correspond to a first radio wave pulse;
   determining a second plurality of normalized phase shifts that correspond to a second radio wave pulse;
   determining if each normalized phase shift in the first plurality of normalized phase shifts is equal to a normalized phase shift in the second plurality of normalized phase shifts; and
   in response to determining if each normalized phase shift in the first plurality of normalized phase shifts is equal to a normalized phase shift in the second plurality of normalized phase shifts, correlating the first radio wave pulse and the second radio wave pulse as originating from a same radio wave transmitter; and
   transmitting a signal indicative of the first radio wave pulse and the second radio wave pulse as originating from the same radio wave transmitter through a circuit.

2. The computer-implemented method of claim 1, further comprising:
   in response to correlating the first radio wave pulse and the second radio wave pulse, determining information about the transmitter as a function of the first radio wave pulse.

3. The computer-implemented method of claim 1, further comprising:
   determining an angle of arrival of the first pulse; and
   determining a location of the transmitter as a function of the determined angle of arrival.

4. The computer-implemented method of claim 1, further comprising:
   normalizing a measured frequency of the first radio wave pulse to a normalized frequency;
   normalizing a measured frequency of the second radio wave pulse to the normalized frequency;
   determining each normalized phase shift in the first plurality of normalized phase shifts as a function of the normalized frequency; and
   determining each normalized phase shift in the second plurality of normalized phase shifts as a function of the normalized frequency.

5. The computer-implemented method of claim 4, further comprising:
   determining a first plurality of measured $2\pi$ radian wraps corresponding to the first radio wave pulse;
   determining a second plurality of measured $2\pi$ radian wraps corresponding to the second radio wave pulse;
   determining each normalized phase shift in the first plurality of normalized phase shifts as a function of a measured $2\pi$ radian wrap in the first plurality of measured $2\pi$ radian wraps; and
   determining each normalized phase shift in the second plurality of normalized phase shifts as a function of a measured $2\pi$ radian wrap in the second plurality of measured $2\pi$ radian wraps.

6. The computer-implemented method of claim 5, further comprising:
   determining a first plurality of normalized $2\pi$ radian wraps corresponding to the first radio wave pulse;
   determining a second plurality of normalized $2\pi$ radian wraps corresponding to the second radio wave pulse;
   determining each normalized phase shift in the first plurality of normalized phase shifts as a function of a normalized $2\pi$ radian wrap in the first plurality of normalized $2\pi$ radian wraps; and
   determining each normalized phase shift in the second plurality of normalized phase shifts as a function of a normalized $2\pi$ radian wrap in the second plurality of normalized $2\pi$ radian wraps.

7. The computer-implemented method of claim 6, further comprising:
   determining a first plurality of measured phase shifts corresponding to the first radio wave pulse;
   determining a second plurality of measured phase shifts corresponding to the second radio wave pulse;
   determining each normalized phase shift in the first plurality normalized phase shifts as a function of a measured phase shift in the first plurality of measured phase shifts; and
   determining each normalized phase shift in the second plurality of normalized phase shifts as a function of a measured phase shift in the second plurality of measured phase shifts.

8. The computer-implemented method of claim 7, further comprising:
   determining a first measured wavelength of the first radio pulse;
   determining a second measured wavelength of the second radio pulse;
   determining each normalized phase shift in the first plurality of normalized phase shifts as a function of the first measured wavelength; and
   determining each normalized phase shift in the second plurality of normalized phase shifts as a function of the second measured wavelength.

9. The computer-implemented method of claim 8, further comprising:
   determining a first normalized wavelength as a function of the first measured wavelength;
   determining a second normalized wavelength as a function of the second measured wavelength;
   determining each normalized phase shift in the first plurality of normalized phase shifts as a function of the first normalized wavelength; and
   determining each normalized phase shift in the second plurality of normalized phase shifts as a function of the second normalized wavelength.

10. A computer-implemented method for automatically determining a location of a radio wave transmitter comprising:
    capturing a plurality of radio wave pulses with a plurality of receiving elements in an antenna array;
    transforming the plurality of captured radio wave pulses into a plurality of digital signals, wherein each digital signal in the plurality of digital signals corresponds to a radio wave pulse in the plurality of captured radio wave pulses;
    determining a plurality of normalized phase shifts, wherein each normalized phase shift in the plurality of normalized phase shifts corresponds to a radio wave pulse in the plurality of captured radio wave pulses; and
    determining at least two radio wave pulses in the plurality of captured radio waves originate from a same radio wave transmitter as a function of at least two normalized phase shifts in the plurality of normalized phase shifts; and transmitting a signal indicative of the at least two radio wave pulses as originating from the same radio wave transmitter through a circuit.

* * * * *